United States Patent Office 3,436,520
Patented Apr. 1, 1969

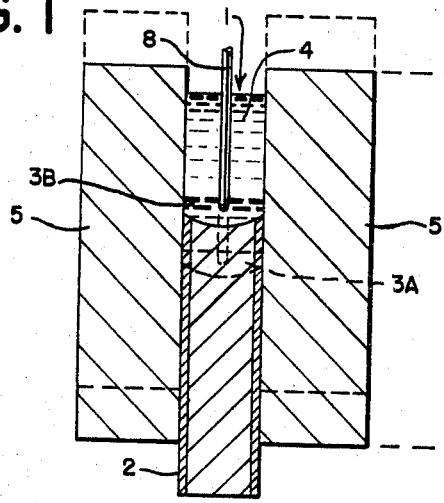
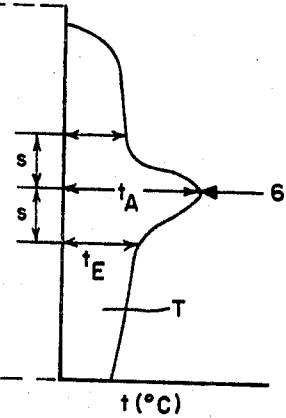
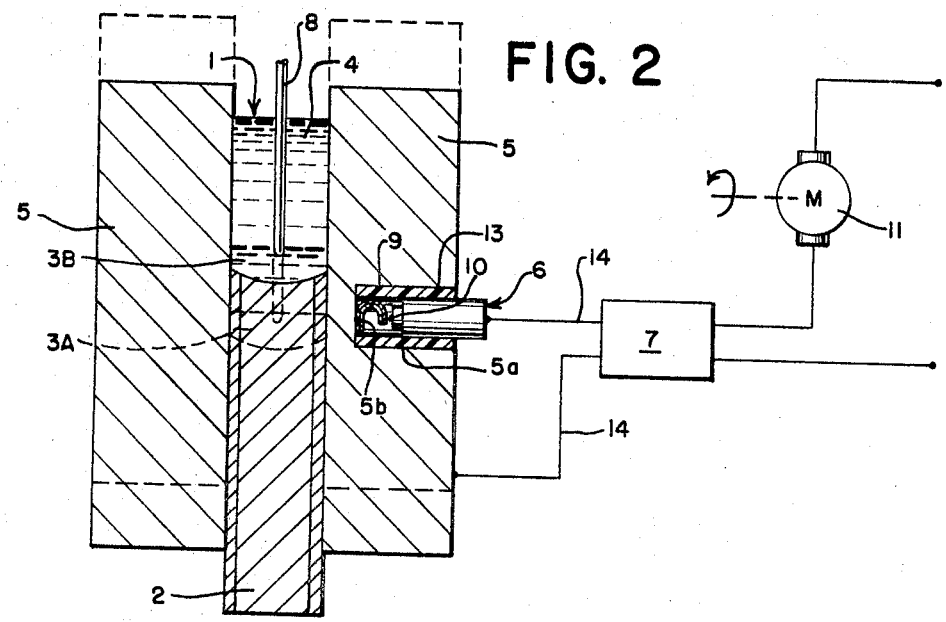
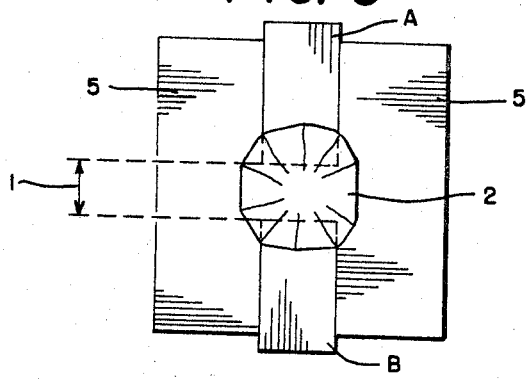
INVENTORS
WALTER ANDERS
ARNOLD WEISSELBERG

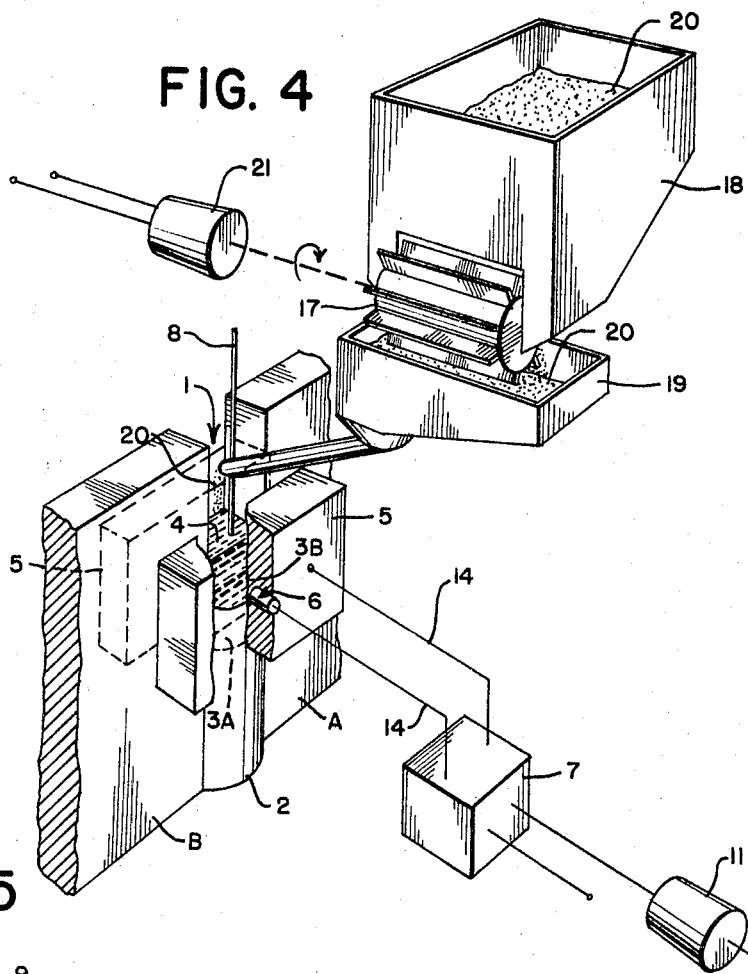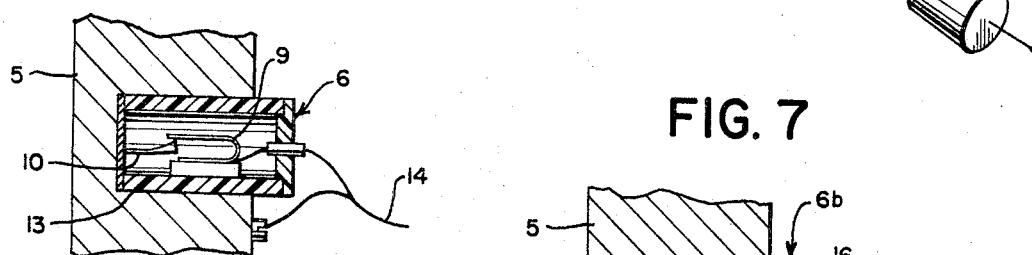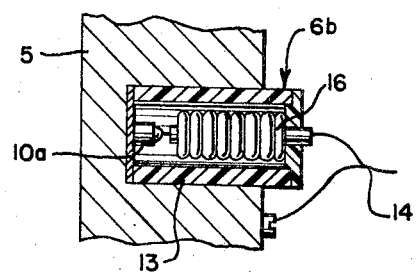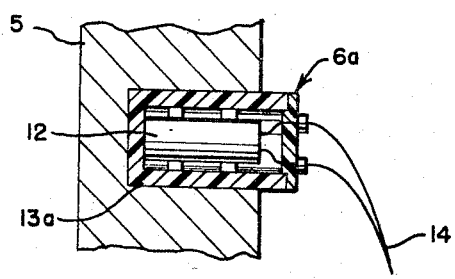

3,436,520
CONTROL SYSTEM FOR ELECTRIC SLAG
WELDING DEVICES
Walter Anders and Arnold Weisselberg, Halle an der
Saale, Germany, assignors to Zentralinstitut fur
Schweisstechnik der DDR, Halle an der Saale,
Germany
Filed Apr. 29, 1968, Ser. No. 724,967
Int. Cl. B23k 9/12
U.S. Cl. 219—126                                    16 Claims

ABSTRACT OF THE DISCLOSURE

Control system, particularly for electric slag welding devices adapted for seams made between two elements to be welded together, comprising one or two jaw members contacting said elements in the area of the welding seam, temperature sensing means associated with or inserted in a recess of said jaw member, and control means for intermittently operating actuating means, forming part of the slag welding device, on effect of the temperature field formed in said jaw member, without making physical contact between the welding-seam area and the sensing means. The latter is preferably connected with an electric circuit, operates on account of deformation due to said temperature field, and may include a bimetallic contact, a temperature-responsive resistor or a deformable hollow member filled with a fluid that expands and thus actuates an electric contact.

---

This invention relates to a control system which provides or triggers appropriate pulses for the feed motion and/or the powder supply of the slag welding device to which it is connected, by change in the temperature field or temperature gradient which is transmitted from the welding-seam area to a jaw member or fitting during the welding process.

Control methods became known which are based on a change in the electrical resistance within the slag bath or the metallic melt bath. The latter touches a contact pin which is supported in an insulated manner; this pin interrupts the armature current of a feed motor by way of relays. The feed motion is thus interrupted until the slag film, which becomes rigid under the metallic melt bath, insulates the contact pin against the melting bath. In the case of thick steel plates or sheet metal, the solidification period of the slag film is very long because of the long-lasting high temperature of the rigidified welding material. As a result of this, the switching process is rather sluggish and does not guarantee any functionally reliable feed motion.

We furthermore know of a method which employs the electrical conductivity of the melted welding powder for control purposes. Here, the control of the feed motion is initiated through current drop by means of a probe, with reference to the metallic melting bath, by way of an amplifier. One disadvantage here is that the current pulses are very small so that the operation of the circuit is very slow in spite of amplification. The control effort is very great. Another disadvantage is represented by the indirect contact between the probes and the slag bath, respectively, the metallic melting bath; this has an adverse effect on the wear and tear of the probes.

For the control of continuous welding powder supply, there is a device which initiates the control process with the help of a probe that is directly in contact with the slag bath. Here again the lack of functional reliability involves a disadvantage which is expressed above all in the welding of comparatively thin sheet metal.

In other known control methods and devices, the exceeding of the Curie temperature and the consequently altered magnetic force-line flow are transmitted inductively or magnetically via various circuit elements for controlling a lifting motor. The expensive circuit arrangement and the resultant breakdown vulnerability have a very disadvantageous effect in these known methods and devices.

It is the object of this invention to increase functional reliability of control systems for electric slag welding devices through inertia-less pulses for controlling the feed motion and/or the powder supply in the device, and to simplify the circuits.

The invention is based on the task of creating a control system which is not in direct contact with the welding bath and which will transmit strong, inertia-less pulses to control means operating the feed mechanism and/or the powder supply.

In accordance with major features of the invention, the objects are accomplished in the following manner: changes in the temperature field produced by the melting and slag baths in a jaw member or fitting adjacent thereto are transmitted to a temperature-dependent sensor which is not directly in contact with the baths; the sensor transmits control signals to an actuating mechanism of the slag welding device, for operation of the feed mechanism and/or the powder supply mechanism.

For transmitting the temperature field, the invention contemplates using heat expansion of the sensor, pressure increase, or change of state of aggregate of a gaseous or liquid medium therein. Similarly, the resistance of a semiconductor can be so altered by means of the temperature changes that switching pulses are thus initiated.

As a function of the selected switching sequence, the pulses or signals can then initiate a controlled motion process, or the control takes place directly as a function of the temperature field.

The essential advantage of the inventive control system resides in the following: inertia-less control is obtained of the feed motion or the powder supply, and a reduction in the switching arrangement which considerably reduces breakdown vulnerability. Furthermore, wear and tear of the sensor can be prevented, and this of course increases the lifetime of the entire control system.

Other objects and many of the attendant advantages of the invention will be readily appreciated as the same becomes better understood by reference to the following detailed description, when considered with the accompanying drawings, wherein:

FIG. 1 is a somewhat schematic, vertical section through two elements to be welded together, without showing details of the electric slag welding device or the inventive control system;

FIG. 1a illustrates the temperature field produced in one of the jaw members shown in FIG. 1, and correlated to the latter;

FIG. 2 is a vertical sectional view similar to that of FIG. 1, with the control system according to the present invention added thereto in one of its preferred, exemplary embodiments, e.g., for controlling the feed motion of the slag welding device;

FIG. 3 is a schematic top view of the arrangement shown in FIG. 1, again omitting the welding device and the control system, as well as the filler wire shown in the preceding views;

FIG. 4 is a perspective view of the control system as illustrated in FIG. 2, but in association with the welding powder feed mechanism of the slag welding device;

FIG. 5 is a partial, sectional view taken from FIG. 2, showing another exemplary embodiment of a sensor forming part of the inventive control system;

FIG. 6 is a view similar to that of FIG. 5, showing a further sensor embodiment, incorporating a temperature-responsive resistor; and FIG. 7 is yet another exemplary sensor embodiment, in a sectional view similar to those of FIGS. 5 and 6, incorporating a deformable hollow member adapted to be filled with a fluid.

Reference should first be had to FIGS. 1, 1a, 2 and 3, showing the general arrangement in a slag welding device; the inventive control system is only shown in FIG. 2 (and in the consecutive FIGS. 4 through 7 to be described later). The two sheet-metal members or elements A, B to be welded (see FIG. 3) are separated by the welding slot or gap 1 which is partly filled up with a welding seam 2 (FIGS. 1 and 2). Above the formed seam, the metal melt 3 and thereabove the slag melt 4 are shown, with the melt zone therebetween.

According to the invention, one or two jaw members, fittings or shoes 5 are disposed in contact with one or both sides of the elements A, B to be joined by welding. In FIG. 2, the inventive control system comprises a temperature sensor generally designated by numeral 6 in one of its preferred exemplary embodiments, electrically linked to a control device or signal transmitter 7. Above the metal melt 3, a filler wire 8 may be used as is conventional in the welding process in question. Other details of FIG. 2 will be described somewhat later as the specification proceeds.

In the electric slag welding process the melting bath 3, flanked or enclosed by the jaw members 5, moves in upward direction in the gap 1. In a known manner, the increase or upward movement is in direct proportion with the amount of the filler wire 8 that has been melted off during the process. A temperature field or gradient T (see FIG. 1a) is produced in the jaw members 5 and this field of course also moves upward as the welding seam 2 is extended between the elements A and B.

For proper heat distribution, the jaw members 5 are preferably made from copper, and are connected to a feed mechanism or lever system forming part of the slag welding device, as is fully disclosed and described in the copending and coassigned patent application Ser. No. 680,840 of A. Weisselberg et al., filed Nov. 6, 1967, for "Self-Locking Lever System for Seam Welding Devices." In that application, closely related with FIG. 2 of the present application, one of the elements A, B to be welded together is shown in FIG. 2 at "1"; the formed welding seam 2 has the same numeral "2"; the metal and slag melts 3, 4 of the present application are numbered "3" and "5" respectively (the melt zone therebetween being identified by numeral "4"). The jaw members 5 correspond to the form shoes "11," "21" of the earlier application; the filler wire 8 is numbered "6" and has a feed mechanism "50" of its own.

The related earlier application for a lever system also discloses a drive motor "32" by which the system is moved along the elements to be welded while the seam is formed, as well as a mechanism and drive for feeding the filler wire "6." Reference has been made in that application to control equipment and other devices for operating the lever system with a view to obtaining a satisfactory welding seam. Reference will be had later to these details as the present description proceeds.

It should be understood that the jaw members 5 are moved along the welding gap 1, for example by the mechanism disclosed in the copending earlier application, so that the sensor 6 of FIG. 2 is always located in the area of the maximum temperature field (as shown by an arrow in FIG. 1a).

Referring in particular to FIGS. 1 and 1a, it should be assumed that the melting bath or metal melt 3 has moved from an initial or previous level 3A to a consecutive, higher level 3B. If the jaws 5 were left stationary, the sensor 6 would receive a temperature $t_E$ which is necessarily much lower than the maximum temperature $t_A$, as clearly shown in the temperature graph of FIG. 1a. The range $t_E$ must consequently be moved upward, by a distance marked s, in order to provide the sensor 6 at the location of maximum temperature effect. The control system according to the invention accomplishes just that, as will be understood from the explanations that will follow.

One of the jaw members 5 has a recess 5a therein, and the sensor 6 is inserted in said recess so that its front face 5b touches the end of the sensor. Any of the alternative sensor embodiments 6, 6a and 6b of FIGS. 5, 6 and 7 can of course be used in the set-up of FIG. 2; and FIG. 4 can of course similarly accommodate any one of the exemplary sensor types. It is important to note that there is no direct physical contact between the sensors and the melt or slag baths. The control system is set so that the maximum temperature field $t_A$ coincides with the location of the sensor 6 in the recess 5a.

Regrettably, the maximum temperature field does not have an accurately reproducible value because it is affected by the size and the shape or volume of the copper jaw members 5, the cooling of the same, if any, the welding parameters, and other factors. However, the maximum temperature is always sharply delimited in the area of the melt zone (between the metal and slag melts 3 and 4) so that it can be used for producing or triggering a control pulse or signal for operation of the appropriate mechanisms of the slag welding device to which the inventive control system is fitted.

FIG. 2 shows the exemplary sensor 6 electrically connected to the control device 7, e.g., by means of preferably flexible conductors 14. As a matter of example, a motor 11 is shown in the control circuit, intermittently operated from a conventional power source (not shown), on effect of the pulses received from the sensor 6. The motor 11 may be the feed or transport motor "32" of the lever system disclosed in the above-mentioned co-pending application, whereby the jaw members 5 ("11" and "21" in the earlier case) are moved along the elements A, B to be joined by welding, together with the sensor 6.

The control device 7 is of course fitted with conventional means for amplification, sensitivity and lag adjustment, for properly correlating the temperature-induced pulses with the desired degree and moment of feed action. In particular, electrical or mechanical means may be included for delaying the operation of the motor 11 or other mechanism acted upon by a predetermined, adjustable value. This will eliminate all-too-fast small movements and make for uniform, smooth movements in the welding device. Means of the described kind being conventional in control circuits, they are neither illustrated nor described in further detail.

The exemplary sensor embodiment of FIG. 2 shows a bimetallic element 9 adapted to close the circuit through a contact 10. Since the element 9 will respond to the maximum temperature field $t_A$, the closing of the contact 10 can be used to actuate relay or other electrical means for disconnecting energization of the motor 11. When the temperature drops, owing to the movement of the melt zone away and above the area of the sensor 6, the bimetallic element 9 will break the contact, whereupon the control device 7 is made to energize the motor 11 long enough to move the system, including the jaw members 5 and the sensor 6, into the maximum temperature zone, together with other operative elements of the slag welding device (as described in the earlier application). The contact can of course be provided also in a normally closed arrangement, thus adapted for direct interruption of a supply circuit to the motor 11 or the like operated mechanism in the welding arrangement.

The sensor 6 (and its modifications to be described later) are preferably fitted to the jaw member 5 in an insulated manner, by means of a sleeve or similar heat insulator 13, as shown in FIG. 2. Ceramic materials or highly heat-resistant plastics are particularly suited for this purpose. An appropriate insulation can provide a desired degree of time lag for actuating the control device 7, without need for a separate delaying means in the latter.

In FIG. 4, the set-up of FIG. 2 is shown in a perspective illustration, for controlling the afore-mentioned motor 11; additionally, a mechanism is shown for controlling the feed of welding powder, possibly forming part of the slag welding device. In a known manner, welding powder 20 is introduced into the baths 3, 4, in the area of the wire 8. This is best accomplished by the aid of a dosing star 17 or similar device, provided in an outlet opening of a powder container 18 for said powder 20. A dosing funnel 19 may be provided below the star 17 for feeding the powder to the place of ultimate use, in the welding gap 1.

The just described powder administering mechanism is actuated by a motor 21 which drives the dosing star 17, as schematically shown in FIG. 4, and this motor may of course be connected to the control device 7 (of either FIG. 2 or 4), as will be understood by those skilled in the art. The control device, and temperature-sensitive input circuit provided therefor in the form of one of the sensors (such as, for example, shown at 6), can thus be disposed to operate the actuating mechanism of the welding device, in the form of the moving mechanism (of the earlier application) or of the administering mechanism (of FIG. 4).

It is entirely possible, and within the scope of the invention, to provide control signals for both actuating mechanisms simultaneously, and/or for other expedients, such as the afore-mentioned feed mechanism "50" of the earlier application, for automatically feeding the filler wire 8 ("6") to the welding zone. The control system of the present invention thus provides foolproof and automatic operation of the associated slag welding device, for producing satisfactory, uniform and economically produced welding seams between plate or sheet-like members.

FIG. 5 shows another exemplary embodiment of the sensor, also identified by numeral 6, having the bimetallic element 9 and the contact 10 therein, the latter either in a normally open or normally closed condition. The shape, length or configuration of the sensor element will change on effect of the temperature field so that direct switching operation can be achieved, without the intermediary of relays or similar electric circuit elements in the control device 7. The latter could thus be eliminated, and the sensor 6 directly intercalated between an electric source and the motor 11 or 21. To this end, the contact 10 is best chosen so as to interrupt the circuit when the maximum temperature is sensed and the element 9 deformed thereby.

FIG. 6 shows a further sensor embodiment 6a with a temperature-responsive resistor 12 or similar circuit element acting upon the circuitry of the device 7 in a conventional manner so as to derive switching functions therefrom. The motor 11 or 21 will thus be selectively energized and deenergized upon reaching or exceeding certain predetermined resistance values, as a function of the temperature field reaching the sensor 6a in the jaw member 5. Known thyratron or thyristor control circuits may of course be used in the control device 7.

In FIG. 6, a capsule-shaped insulating sleeve 13a is used in which the resistor 12 is inserted. The flexible conductors 14 are connected to two poles of the resistor rather than to one pole of the previously described contacts and the jaw member proper (as shown in FIGS. 2 and 5). These are of course detail considerations which can be varied at will, within the scope of the present invention.

Other types of sensors are also within the provisions of the invention, such as, for example, sensor 6b as shown in FIG. 7. This is in the form of a membrane-type hollow member or body 16, preferably made of a molded substance, and adapted to be filled with a gaseous or liquid substance. The expansion of the fluid, on effect of the temperature, makes the member 16 expand or become deformed so as to close a contact 10a secured to the metal face plate of the sensor. A ceramic or other heat-insulating sleeve 13 may again be provided for controlling the speed of reaction on effect of the temperature field in the jaw member 5.

It should of course be understood that any one of the exemplary sensors 6, 6a and 6b, and other known devices of this kind, can be used in the arrangements of FIGS. 2 and 4, for controlling the appropriate mechanisms of the associated slag welding device.

It will be understood by those skilled in the art that the foregoing disclosure relates only to preferred embodiments of the invention and that it is intended to cover all changes and modifications of the examples described which do not constitute departures from the spirit and scope of the invention as set forth in the appended claims.

What we claim is:

1. A control system for electric slag welding devices wherein two elements to be welded together are disposed in spaced-apart relation, with a gap therebetween which is successively filled up with a welding seam, resulting from a metal melt obtained from a filler wire and welding powder administered thereto, and a slag melt formed above said metal melt; the slag welding device having actuating means for producing said welding seam in said gap; the control system comprising, in combination: at least one jaw member contacting both of said elements to be welded together in the area of said welding seam; temperature sensing means associated with said jaw member in the proximity of but devoid of physical contact with said welding-seam area; and control means for intermittently operating said actuating means depending upon the temperature field formed in said jaw member and acting upon said sensing means.

2. The control system as defined in claim 1, wherein said jaw member consists essentially of copper so as to transmit said temperature field to said sensing means in an inertia-less manner.

3. The control system as defined in claim 1, comprising a pair of said jaw members, substantially symmetrically contacting said elements on both sides of said gap.

4. The control system as defined in claim 1, wherein said actuating means of the slag welding device includes a mechanism for moving said jaw member along said gap, and said control means includes drive means for operating said moving mechanism.

5. The control system as defined in claim 1, wherein said actuating means of the slag welding device includes a mechanism for administering said welding powder, and said control means includes drive means for operating said administering mechanism.

6. The control system as defined in claim 5, wherein said administering mechanism includes a container for said welding powder and rotatable dosing means in an outlet opening of said container, and said drive means is connected for operation of said dosing means.

7. The control system as defined in claim 1, further comprising heat insulating means between said jaw member and said sensing means.

8. The control system as defined in claim 1, wherein said control means includes a flexible electric conductor leading to said sensing means.

9. The control system as defined in claim 1, wherein said control means includes an electric circuit leading to said sensing means and including thereat a normally open contact.

10. The control system as defined in claim 9, wherein said contact is closed by deformation due to said temperature field.

11. The control system as defined in claim 9, wherein said contact is a bimetallic contact which is closed by geometric deformation on effect of said temperature field.

12. The control system as defined in claim 1, wherein said control means includes an electric circuit leading to said sensing means and including thereat a temperature-responsive resistor.

13. The control system as defined in claim 12, wherein said control means further includes means for delaying the operation of said actuating means by a predetermined, adjustable value.

14. The control system as defined in claim 1, wherein said sensing means includes a deformable hollow member subject to deformation due to said temperature field.

15. The control system as defined in claim 14, wherein said hollow member is filled with a fluid that expands on effect of said temperature field, said control means including an electric circuit leading to said sensing means and including thereat a contact operable by said deformation of the hollow member.

16. The control system as defined in claim 1, wherein said jaw member has a recess on its face opposite to that contacting said elements to be welded together, and said sensing means is at least partly inserted in said recess.

References Cited
UNITED STATES PATENTS

| | | | |
|---|---|---|---|
| 2,742,553 | 4/1956 | Meyer | 219—126 |
| 3,170,430 | 2/1965 | Bistak | 219—126 |
| 3,233,076 | 2/1966 | Vilkas | 219—131 |
| 3,243,568 | 3/1966 | Borden | 219—73 |
| 3,303,321 | 2/1967 | Harmsen et al. | 219—126 |

RICHARD M. WOOD, *Primary Examiner.*

W. D. BROOKS, *Assistant Examiner.*

U.S. Cl. X.R.

219—130, 73